Nov. 12, 1929.  C. LE R. TRELEAVEN  1,735,815
REFLECTING OPTICAL UNIT
Filed Nov. 20, 1928  2 Sheets-Sheet 1
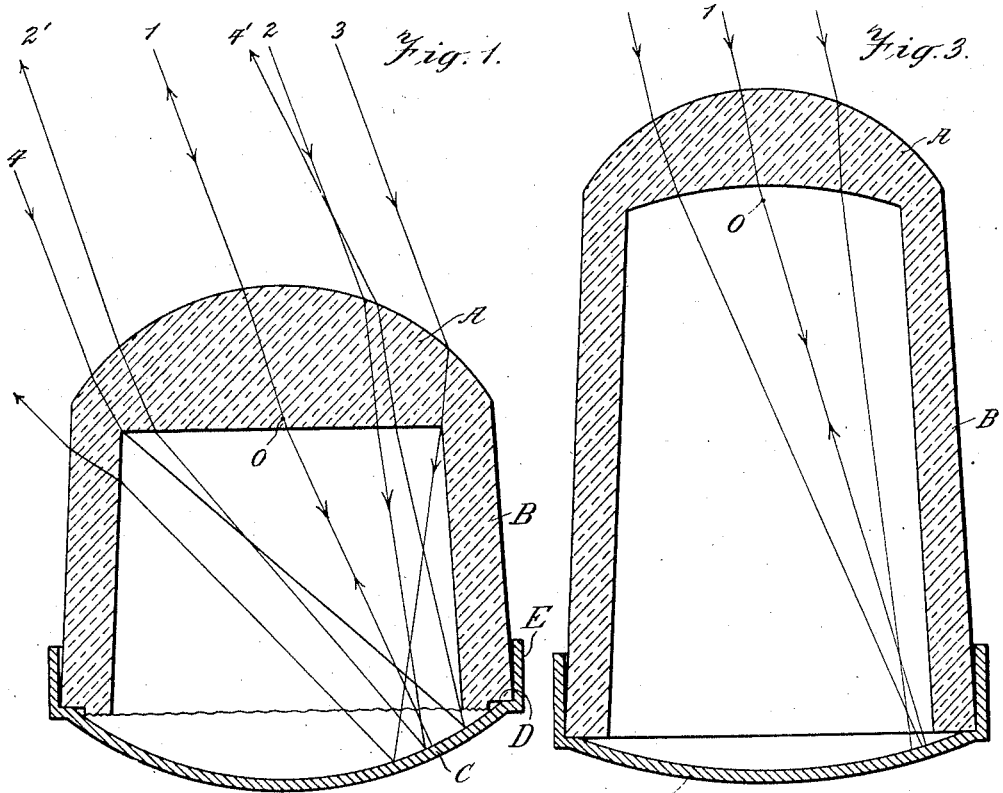
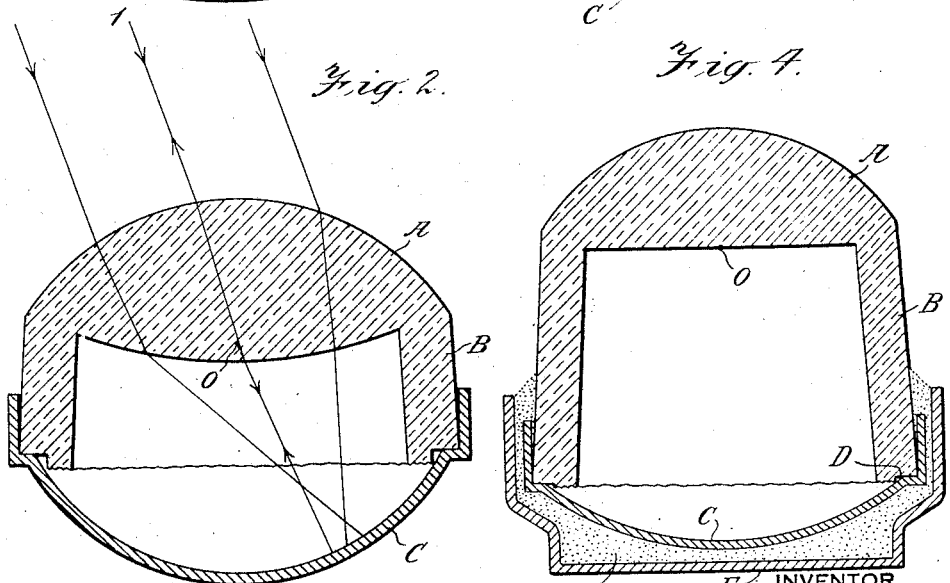

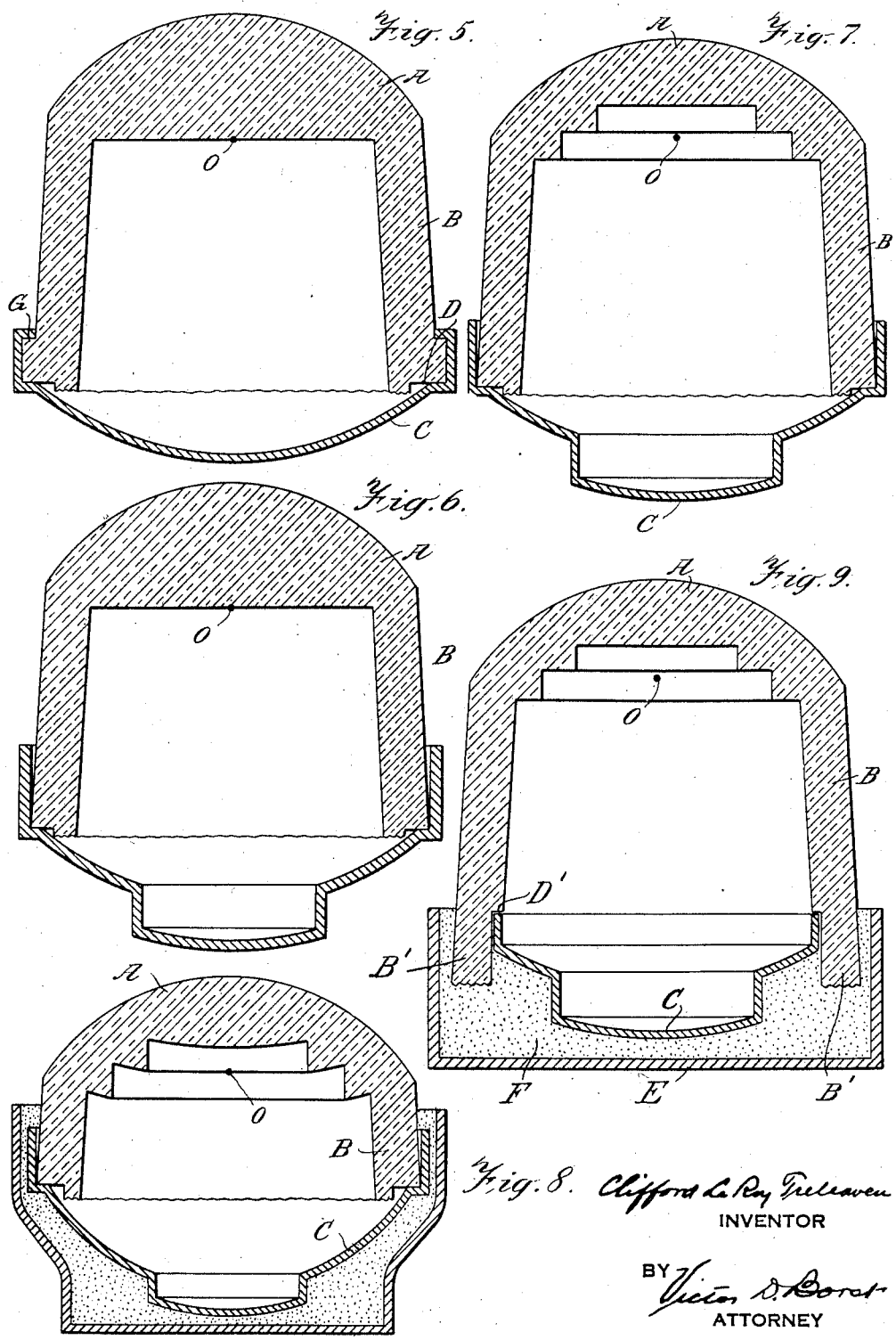

Patented Nov. 12, 1929

1,735,815

UNITED STATES PATENT OFFICE

CLIFFORD LE ROY TRELEAVEN, OF JACKSON HEIGHTS, NEW YORK, ASSIGNOR TO RAY-SIGNS CORPORATION, A CORPORATION OF DELAWARE

REFLECTING OPTICAL UNIT

Application filed November 20, 1928. Serial No. 320,589.

My invention relates to signs of the light reflecting type and particularly to the construction of units which compose the characters of the signs. Such signs are used, for example, as advertising signs or as road side signs and the units have the property of reflecting light which falls upon them so as to appear self-luminous after the manner of eyes of certain animals.

This characteristic of the units results from their ability to collect the incident light and focus it upon a reflecting mirror which is so related to the lenticular part of the unit that the light is returned upon its incident path but in a slightly diverging or conical form so as to be visible at one side of the light source.

The component parts of the unit as usually employed for commercial signs are a positive lens and a concave mirror. As ordinarily constructed, the surface of the mirror is spherical and is substantially at the focal point of the lens for axially incident light. It is obviously desirable that the angle of aspect be as wide as possible, that is, that the unit shall function efficiently with light falling obliquely upon it at a considerable angle with the axis of the unit.

To obtain this desired angle of aspect it has been supposed to be necessary to use a so-called solid lens, that is, a solid body of glass or equivalent transparent material having its outer end convex to form the objective and extending to the mirror itself. The rear end may be plano or it may be convex, and it has been suggested to silver the rear convex end to constitute it the mirror.

While there are obvious physical advantages in having the glass extend continuously from the lenticular end of the unit to the mirror, due principally to the absence of connections or joints which are required if a separate collar or shell is used to couple the lens and reflector, there are also disadvantages in forming such a relatively large glass unit since economy in cost is a factor to be considered in such commercial units and it is therefore desirable to mold it and avoid or at least minimize grinding operations.

There is, however, an element of difficulty in molding such a body of glass and have it retain the requisite form for the optical properties. The solid body of glass will upon cooling tend to form what are known as shrink spots, and these are most likely to develop as flattened portions of the convex lenticular or reflecting surfaces. An expensive grinding operation to correct the fault is then necessary.

I have found that it is possible to employ a hollow body of glass or equivalent material, the outer end of which constitutes the lens and which affords the advantages in physical construction of the unit composed of a solid lens and reflector connected immediately thereto, and still get as wide an angle of aspect for the unit as it is possible to get with the solid glass type of unit. This obviates the irregularity in shrinking and consequent shrink spots, and enables the glass part of the unit to be formed wholly by molding.

The rear of the hollow glass body according to my invention is open ended, the hollow cylindrical collar extending rearwardly from the lens to the mirror serves as a shell to unite the mirror and lens and has the advantage of being integral with the lens and also being transparent and hence affording some luminosity due to the transmission of rays which would otherwise be lost.

The mirror is disposed with its central radius coincident with the axis of the lens and its apex is substantially at the focal point of a bundle of rays axially incident upon the lens. The reflecting surface is spherical and in order that the light may be returned on its incident path and the unit have a full effective aperture, that is, its entire end be luminous at any angle of incidence of light within a wide angular range, I dispose the center of curvature of the mirror for any given index of refraction of glass on the axis of the lens at or near the point where the axis is intersected, really or virtually, by that portion of the chief or central ray of an obliquely incident bundle which has traversed the lens once and is incident upon the mirror. In other words, the center of curvature of the mirror is so located with respect to the lens that the central ray of an incident bundle whether axial or oblique, will strike the mirror along a radial path or at normal incidence and will therefore be reflected along the same path, while the surrounding rays will be substantially symmetrically reflected about the central ray but on relatively reverse sides thereof. This gives the desired full aperture to the unit and also causes the light to be returned upon its own path. The spherical aberration will be sufficient to give the desired spread to the light.

With such a unit, due principally to the fact that the light is twice refracted upon entering, the second time at a point relatively far from the reflector, the peripheral portions of a simple, spherical reflecting surface will not contain the foci of obliquely incident light upon the lens but will be to the rear thereof, and this departure from the focal points increases progressively from the center of the mirror outwardly. The result is inefficiency and a relatively narrow range of aspect for the unit.

To correct this and thereby increase the angle of aspect, I so shape the mirror according to one form of my invention as to cause all portions of it to contain substantially the focal points of the lens for light which is focused upon the particular portion of the surface. The path of the foci as light sweeps from one angular extreme to the other across the lens in any plane is not a true arc of a circle but departs substantially therefrom, shortening its foci length progressively as it increases its angular relation with the axis of the lens. To compensate for this I make the reflecting surface in a series of stepped, concentric, spherical zones, each one from the center outward being of shorter radius. This retains the spherical form which is necessary to get the normal incidence of the central ray, and at the same time gives the unit a much wider angle of aspect since the more oblique rays are reflected in their entirety and returned on their own path. In this way I am able to give to the unit an angle of aspect of as much as 32° on either side of axial incidence.

The efficiency of the unit may according to my invention be increased by making the inner surface of the lens in the form of a series of stepped zones decreasing in thickness toward the center. This will cause the outer rays of an incident bundle to be brought more nearly to the same focus as the central rays, and incidentally makes a lighter and thinner lens. The efficiency of the unit is substantially increased by employing both the stepped mirror and the stepped inner surface for the lens.

The inner surface of the lens may be plano, concave or convex, the length of the unit being determined by the focal length of the lens. The optical relation of the reflecting surface to the lens must be maintained constant, and my invention also contemplates various ways of attaching the mirror and glass body to maintain this relationship and compensate for variations in length of the glass collar.

Other details of my invention will appear from the following description. I shall now describe the illustrated embodiments of my invention and shall thereafter point out my invention in claims.

Fig. 1 is a central axial section of an embodiment of my invention having a plano-convex lens with light rays represented in diagram;

Fig. 2 is a similar view of a modified construction with a double convex lens;

Fig. 3 is a similar view of the construction, as modified, with a concave-convex lens;

Fig. 4 is a similar view of the unit shown in Fig. 1 with a protecting cap added thereto;

Fig. 5 is a similar view showing an alternative way of attaching the mirror to the lens collar;

Fig. 6 is a view similar to Fig. 1 with a modified form of mirror;

Fig. 7 is a view similar to Fig. 6 with a modified form of lens to correct for spherical aberration;

Fig. 8 is a similar view of a concave-convex lens with the modified form of mirror and a protecting cap applied thereto;

Fig. 9 is a view similar to Fig. 7 with the addition of a protective cap and illustrating a modification of the lens collar with respect to the formation of the mirror seat.

It will be understood that the drawings represent substantially the correct proportions of the parts, but that the sizes are optional. It will be assumed that the lens material is glass having an index of refraction of substantially 1.52.

The lens A of Fig. 1 is plano-convex and of a thickness slightly greater than one-half of the radius of curvature of the front face. Rearwardly of the lens the body of glass is hollow, forming the annular collar or shell B. Bearing and in some manner (not indicated in this figure) secured against the rear end of the collar B is a spherical reflector or mirror C. This mirror has its concave face toward the lens and is arranged with its vertex or apex at least substantially in the focal point of the lens A for axially incident light, this location being determined by the limiting shoulder D against which the mirror bears. In this construction the mirror has a surrounding marginal flange E which fits over the rear end of the collar B, the collar being shown as slightly tapered or conical for molding convenience.

Except possibly for ruggedness which for most uses may well be sacrificed, it is apparent that this glass lens and collar have all the advantages of the solid construction, but the relatively less quantity of glass obviates the formation of shrink spots and enables the glass part to be molded. The fact that the collar B is transparent and is integral with the lens provides a ready means for positioning the mirror with a minimum of joints and also gives a certain illumination to the collar which is not possible with an opaque construction.

The determination of the radius of curvature of the mirror and the location of its center, is a particular problem. In order to afford the widest possible aperture to the lens, i. e., the maximum area of illumination of the lenticular end within a wide angular range of aspect, it is necessary that the central axial ray of the incident bundle of rays be returned as the central ray of the reflected beam, in which event the surrounding rays will be reflected on respectively opposite sides of the central ray but in substantially symmetrical relation thereto. For this result I locate the center of curvature of the mirror on the axis of the lens and at or near the point where the axis is intersected (really or virtually) by the chief or central ray of every bundle of incident light, whether axial or oblique, after it has traversed the lens once and before it has been reflected by the mirror. In this event the central ray will strike the mirror along a radial path and due to its normal incidence will be reflected back on its entering path. The surrounding rays will be reversed in position but will be reflected substantially symmetrically about the central ray.

For example, in the unit shown in Fig. 1, the center O of the reflecting surface of the mirror is substantially at the axial point of the rear face of the lens, and the index of refraction of the glass is such that the central ray 1 of the incident light is refracted so as to cross the axis substantially at the point O. Upon emerging, therefore, it is refracted along a radial line of the mirror. As indicated by the arrows, it is consequently returned upon the same path. The entering ray 2 will be substantially reversed in position with respect to the ray 1 and will be reflected as the ray 2'. The outside ray 4 will be returned on the path of the ray 4', while the ray 3 will be lost in that it will not be returned through the lens. It will, however, pass through the transparent collar B and will serve somewhat to illuminate the collar. The spherical aberration of the lens, which is exemplified by the disposition of the focus of the rays 3 and 4 ahead of that of the more central rays, serves to give to the reflected rays the desired spread or conical form so as to render the unit visible at a point more or less to one side of the source of light; for example, so as to render it visible to the occupants of an automobile the head lights of which illuminate the sign.

In Fig. 2 the lens is shown as a double convex lens. This, of course, shortens the focal length and therefore shortens the unit. In this case the center of curvature of the mirror is at the point O, somewhat within the body of the lens. Assuming the ray 1 to be the central ray of an incident bundle, it will upon its second refraction assume the radial path as indicated, so that the intersection of the axis by that portion of the ray which has traversed the lens and is incident upon the mirror is in this case virtual instead of real.

In Fig. 3 the lens though positive, is shown as concave-convex, which serves to increase the length of the unit due to the increased focal length. The central ray 1 of the incident bundle in this case crosses the axis of the lens at the point O after its second refraction, that is, its intersection with the axis is real. In other words, the intersection with the axis at the center of the reflecting surface is virtual when the center is forward of the rear face of the lens, as in Fig. 2, and is real when it is back of the rear face of the lens, as in Fig. 3. In either case the required position of the mirror determines the length of the collar B, although it will be understood that my invention is not of necessity limited to the collar B extending to the mirror C.

In Fig. 4 there is shown one way within the purview of my invention for securing the mirror C against the shoulder D of the collar B of the lens A. In this case I employ a cap E for the purpose which encloses the rear end of the unit including the mirror C and is secured thereto by cement F. In this way, the mirror is protected and the joint between the mirror and the collar is covered and rendered impervious.

In Fig. 5, another way is shown for securing the mirror in place against the rear end of the collar of the lens. In this case, an external circumferential shoulder G is formed on the rear end of the collar and the flange of the mirror has its top edge spun over the shoulder. If it is found necessary, a gasket of suitable material may be interposed between the flange of the mirror and the shoulder G.

In Fig. 6, there is shown a modified construction which gives to the unit a somewhat wider angle of aspect than does the simple mirror of the previous figures. This construction contemplates making the reflector in two or more zones, each zone being a portion of a sphere and all having a common center O. Although the reflector is shown as divided into but two zones in this figure, it will be understood that the number may be increased and will depend somewhat upon the size of the unit. The radius of curvature of the zones will become progressively shorter from the center of the reflector outward to its periphery. This stepping of the reflector serves to bring its peripheral portions more nearly into the focal points of obliquely incident light. In this way the central or chief ray is always permitted to strike the reflector at normal incidence since all portions of the reflecting surface are spherical and the unit is caused to have a wider aperture with the more obliquely incident light.

The unit shown in Fig 7 is further modified to reduce the spherical aberration of the lens and thereby increase its efficiency. In this construction the lens is reduced in thickness in one or more stages or steps from its periphery toward the center. This is done by providing the steps in the rear face, as shown in this figure. In the illustrated lens, there are two steps or reductions formed, although it will be understood that this number may be varied and will depend somewhat upon the size of the lens. This construction results in relatively moving forward the focal points of the inner zones and thus bringing the foci of all of the zones more nearly to a common point. The stepped lens is shown in conjunction with the stepped reflector, the reflecting surface of which approximately contains the foci of the lens for incident light in all directions within the range of aspect of the unit. The provision of a sharper focus which this lens affords together with the approximate disposition of the reflecting surface so as to contain every foci of the lens within the range of aspect makes for materially improved efficiency for the unit.

The unit shown in Fig. 8 differs from that shown in Fig. 7 in that the lens is double convex and the unit is therefore substantially shorter. As in the other cases, the center O for all of the zones of the reflector is so located on the axis of the lens as to coincide with the point at which the central ray of an incident bundle of rays crosses the axis. This location, of course, varies with the index of refraction of the glass and if, as shown in Figs. 7 and 8, it is behind the rear surface of the lens, then this center is at the point where the central incoming ray actually crosses the axis of the lens.

The importance of maintaining the correct optical relation between the reflecting surface of the mirror and the lens will be readily appreciated. In Fig. 9 there is shown one expedient by which this relation may be accurately obtained in a molded lens and also a way be provided to take care of variations in the quantity of glass which may be placed in the mold. In this construction the limiting shoulder D' is formed internally of the collar B and the end B' of the collar which extends beyond the shoulder simply protrudes more or less into the cement F between the mirror C and the cap E. It will usually be unnecessary with such a construction to remove any of the end of the collar, while in such constructions as is shown in the preceding figures in which the limiting shoulder D is formed on the outer portion of the end face of the collar, it may sometimes happen that the quantity of glass in the mold will be so great that the end of the collar beyond the shoulder D may have to be chipped off to enable the mirror to be disposed against the shoulder.

It is obvious that other modifications than those shown in the drawings and above particularly described may be made without departing from the scope of my invention as defined in the appended claims.

I claim:

1. An optical unit of the reflecting type comprising a spherical collecting lens having an integral collar extending axially from the rear face thereof, and a spherical concave reflecting mirror bearing against said collar and spaced thereby from the rear face of the lens with its vertex substantially in the focal point of the lens for axially incident light and with its center of curvature substantially at the point where the axis of the lens is intersected, really or virtually, by the chief or central ray of an obliquely incident bundle after it has traversed the lens once and is incident upon the reflector.

2. An optical unit of the reflecting type comprising a spherical collecting lens, and a spherical concave reflecting mirror back of the lens and spaced therefrom with its vertex substantially in the focal point of the lens for axially incident light and with its center of curvature substantially at the point where the axis of the lens is intersected, really or virtually, by the chief or central ray of an obliquely incident bundle after it has traversed the lens once and is incident upon the reflector.

3. An optical unit of the reflecting type comprising a collecting lens and a concave mirror back of the lens and spaced therefrom with its vertex substantially in the focus of the lens for axially incident light, said mirror being stepped to provide a peripheral portion of shorter radius than the central portion and disposed substantially in the focus of the lens for obliquely incident light which is collected upon it.

4. An optical unit of the reflecting type comprising a collecting lens and a spherical concave mirror back of the lens and spaced therefrom with its vertex substantially in the focus of the lens for axially incident light, said mirror being stepped to provide a plurality of concentric spherical zones of successively shorter radius from the central to the outer zone, whereby each zone is disposed substantially in the focus of the lens for light which is collected upon it.

5. An optical unit of the reflecting type comprising a spherical collecting lens the rear face of which is zoned so as to provide a plurality of concentric lenticular zones all having substantially the same focus and thereby minimize spherical aberration, and a spherical concave reflecting mirror back of the lens and spaced therefrom with its vertex substantially in the focal point of the lens for axially incident light and with its center of curvature substantially at the point where the axis of the lens is intersected, really or virtually, by the chief or central ray of an obliquely incident bundle after it has traversed the lens once and is incident upon the reflector.

6. An optical unit of the reflecting type comprising a spherical collecting lens the rear face of which is zoned so as to provide a plurality of concentric lenticular zones all having substantially the same focus and thereby minimize spherical aberration, and a spherical concave reflecting mirror back of the lens and spaced therefrom with its vertex substantially in the focal point of the lens for axially incident light and with its center of curvature substantially at the point where the axis of the lens is intersected, really or virtually, by the chief or central ray of an obliquely incident bundle after it has traversed the lens once and is incident upon the reflector, said mirror having the peripheral portion of its reflecting surface of shorter radius than its central portion and disposed substantially in the focus of the lens for obliquely incident light which is collected upon it.

In witness whereof, I hereunto subscribe my signature.

CLIFFORD LE ROY TRELEAVEN.